US008023955B2

(12) United States Patent
Anderson

(10) Patent No.: US 8,023,955 B2
(45) Date of Patent: Sep. 20, 2011

(54) UPLINK RESOURCE ALLOCATION TO CONTROL INTERCELL INTERFERENCE IN A WIRELESS COMMUNICATION SYSTEM

(75) Inventor: Nicholas William Anderson, Bristol (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/208,512

(22) Filed: Aug. 22, 2005

(65) Prior Publication Data

US 2007/0042784 A1 Feb. 22, 2007

(51) Int. Cl.
*H04W 72/00* (2009.01)
(52) U.S. Cl. .............. 455/450; 455/63.1; 455/67.13; 455/432.1; 455/552.1; 370/310.2; 370/318; 370/319; 370/320; 370/321; 370/328
(58) Field of Classification Search ............... 455/432.1, 455/436, 450, 522, 63.1, 67.13; 370/310.2, 370/318, 319–321, 328
See application file for complete search history.

(56) References Cited

U.S. PATENT DOCUMENTS

| | | | | |
|---|---|---|---|---|
| 5,491,717 A | * | 2/1996 | Hall | 370/332 |
| 5,978,657 A | | 11/1999 | Suzuki | |
| 6,104,933 A | * | 8/2000 | Frodigh et al. | 455/522 |
| 6,144,861 A | * | 11/2000 | Sundelin et al. | 455/522 |
| 6,212,364 B1 | * | 4/2001 | Park | 455/69 |
| 6,405,021 B1 | * | 6/2002 | Hamabe | 455/69 |
| 6,754,496 B2 | * | 6/2004 | Mohebbi et al. | 455/436 |
| 7,009,953 B2 | * | 3/2006 | Tiedemann, Jr. | 370/332 |
| 7,031,742 B2 | * | 4/2006 | Chen et al. | 455/522 |
| 7,146,175 B2 | * | 12/2006 | Rune et al. | 455/453 |
| 7,239,619 B2 | * | 7/2007 | Tobe et al. | 370/331 |

2004/0209624 A1 10/2004 Rune et al.
(Continued)

FOREIGN PATENT DOCUMENTS

EP 0918402 * 5/1999
(Continued)

OTHER PUBLICATIONS

3rd Generation Partnership Project, Technical Specification Group Services and System Aspects, Technical Specifications and Technical Reports for a UTRAN-based 3GPP system, (Release 6) 3GPP TS 21.101 V6.2.0 (Jun. 2005).

(Continued)

*Primary Examiner* — Steve D Agosta
(74) *Attorney, Agent, or Firm* — Oblon, Spivak, McClelland, Maier & Neustadt, L.L.P.

(57) ABSTRACT

Embodiments of the present invention exploit the reciprocity of radio channels in TDD, and longer-term correlation between average uplink and downlink path losses in FDD wireless communication systems to enable distributed schedulers in an enhanced uplink system to allocate uplink transmission resources while preemptively managing intercell interference levels. Each cell's base station transmits a downlink reference signal at a known transmission power level. A mobile station monitors the received signal strength of the downlink reference signals from multiple base stations. The transmitted and received signal strength levels can be used by the mobile station to estimate the amount of intercell interference that the mobile station's uplink transmissions cause, and the mobile station's uplink transmission parameters are adjusted accordingly. In further embodiments, the received reference signal power levels, or values derived therefrom, are transmitted by the mobile station to its serving base station, where a scheduling algorithm uses the information to adjust one or more transmission parameters relating to a grant of uplink transmission resources to the UE, thereby controlling the intercell interference generated by the mobile station's uplink transmissions.

5 Claims, 11 Drawing Sheets

U.S. PATENT DOCUMENTS

2005/0249133 A1* 11/2005 Terry et al. .................. 370/278
2006/0160550 A1* 7/2006 Edwards .................. 455/509

FOREIGN PATENT DOCUMENTS

| EP | 0918402 A2 | 5/1999 |
| EP | 1282241 A1 | 2/2003 |
| EP | 1 447 938 | 8/2004 |
| EP | 1617691 A1 | 1/2006 |
| WO | WO-2004/043102 A1 | 5/2004 |

OTHER PUBLICATIONS

3rd Generation Partnership Project, Technical Specification Group Services and System Aspects, Evolution of 3GPP System, (Release 6) 3GPP TR 21.902 V6.0.0 (Sep. 2003).

3rd Generation Partnership Project, Technical Specification Group Services and Systems Aspects, Network Architecture (Release 6) 3GPP TS 23.002 V6.8.0 (Jun. 2005).

3rd Generation Partnership Project, Technical Specification Group Radio Access Network, User Equipment (UE) radio transmission and reception (FDD) (Release 6) 3GPP TS 25.101 V6.8.0 (Jun. 2005).

3rd Generation Partnership Project, Technical Specification Group Radio Access Network, User Equipment (UE) radio transmission and reception (TDD) (Release 6) 3GPP TS 25.102 V6.1.0 (Jun. 2005).

3rd Generation Partnership Project, Technical Specification Group Radio Access Network, Base Station (BS) radio transmission and reception (FDD) (Release 6) 3GPP TS 25.104 V6.9.0 (Jun. 2005).

3rd Generation Partnership Project, Technical Specification Group Radio Access Network, Base Station (BS) radio transmission and reception (TDD) (Release 6) 3GPP TS 25.105 V6.2.0 (Dec. 2004).

3rd Generation Partnership Project, Technical Specification Group Radio Access Network, Physical channels and mapping of transport channels onto physical channels (FDD) (Release 6), 3GPP TS 25.211 V6.5.0 (Jun. 2005).

3rd Generation Partnership Project, Technical Specification Group Radio Access Network, Multiplexing and channel coding (FDD) (Release 6), 3GPP TS 25.212 V6.5.0 (Jun. 2005).

3rd Generation Partnership Project, Technical Specification Group Radio Access Network, Spreading and modulation (FDD) (Release 6) 3GPP TS 25.213 V6.3.0 (Jun. 2005).

3rd Generation Partnership Project, Technical Specification Group Radio Access Network, Physical layer procedures (FDD) (Release 6) 3GPP TS 25.214 V6.6.0 (Jun. 2005).

3rd Generation Partnership Project, Technical Specification Group Radio Access Network, Physical layer—Measurements (FDD) (Release 6) 3GPP TS 25.215 V6.3.0 (Jun. 2005).

3rd Generation Partnership Project, Technical Specification Group Radio Access Network, Physical channels and mapping of transport channels onto physical channels (TDD) (Release 6) 3GPP TS 25.221 V6.4.1 (Jun. 2005).

3rd Generation Partnership Project, Technical Specification Group Radio Access Network, Multiplexing and channel coding (TDD) (Release 6 ) 3GPP TS 25.222 V6.2.0 (Dec. 2004).

3rd Generation Partnership Project, Technical Specification Group Radio Access Network, Spreading and modulation (TDD) (Release 6) 3GPP TS 25.223 V6.0.0 (Dec. 2003).

3rd Generation Partnership Project, Technical Specification Group Radio Access Network, Physical layer procedures (TDD) (Release.6) 3GPP TS 25.224 V6.5.0 (Jun. 2005).

3rd Generation Partnership Project, Technical Specification Group Radio Access Network, Physical layer, Measurements (TDD) (Release 6) 3GPP TS 25.225 V6.1.0 (Mar. 2004).

3rd Generation Partnership Project, Technical Specification Group Radio Access Network, FDD Enhanced Uplink, Overall description, Stage 2 (Release 6) 3GPP TS 25.309 V6.3.0 (Jun. 2005).

3rd Generation Partnership Project, Technical Specification Group Radio Access Network, Feasibility Study on Uplink Enhancements for UTRA TDD (Release 6) 3GPP TR 25.804 V2.0.0 (Feb. 2005).

3rd Generation Partnership Project, Technical Specification Group Radio Access Network, FDD Enhanced Uplink, Physical Layer Aspects (Release 6) 3GPP TR 25.808 V2.0.0 (Mar. 2005).

3rd Generation Partnership Project, Technical Specification Group Radio Access Network, Physical layer aspects of UTRA High Speed Downlink Packet Access (Release 4) 3GPP TR 25.848 V4.0.0 (Mar. 2001).

3rd Generation Partnership Project, Technical Specification Group Radio Access Network, Feasibility Study considering the viable deployment of UTRA in additional and diverse spectrum arrangements (Release 6) 3GPP TR 25.889 V6.0.0 (Jun. 2003).

3rd Generation Partnership Project, Technical Specification Group Radio Access Network, Feasibility Study for Enhanced Uplink for UTRA FDD (Release 6) 3GPP TR 25.896 V6.0.0 (Mar. 2004).

"3rd Generation Partnership Project; Technical Specification Group Serives and System Aspects; Vocabulary for 3GPP Specifications (Release 6)," (Jun. 2005). 3GPP:Valbonne, France, TR 21.905 v6.9. 0:1-54.

Alcatel. (Jun. 2-4, 2004). "OFDM for UTRAN Enhancement—Further Proceeding," 3GPP TSG RAN WG1 Meeting #37, RP-04-0229, Seoul, South Korea, 2 pages.

Holma, H. et al. eds. (2001). WCDMA for UMTS: Radio Access for Third Generation Mobile Communications. John Wiley & Sons Ltd.: West Sussex, England, 10 pages (Table of Contents).

International Search Report mailed Dec. 22, 2006, for PCT Application No. PCT/EP2006/064459 file Jul. 20, 2006, 3 pages.

European Search Report issued Feb. 9, 2011, in EP 10 16 3972 filed Jul. 20, 2006.

3GPP "OFDM with interference control for improved HSDPA coverage." Alcatel, May 2004, pp. 1-11.

* cited by examiner

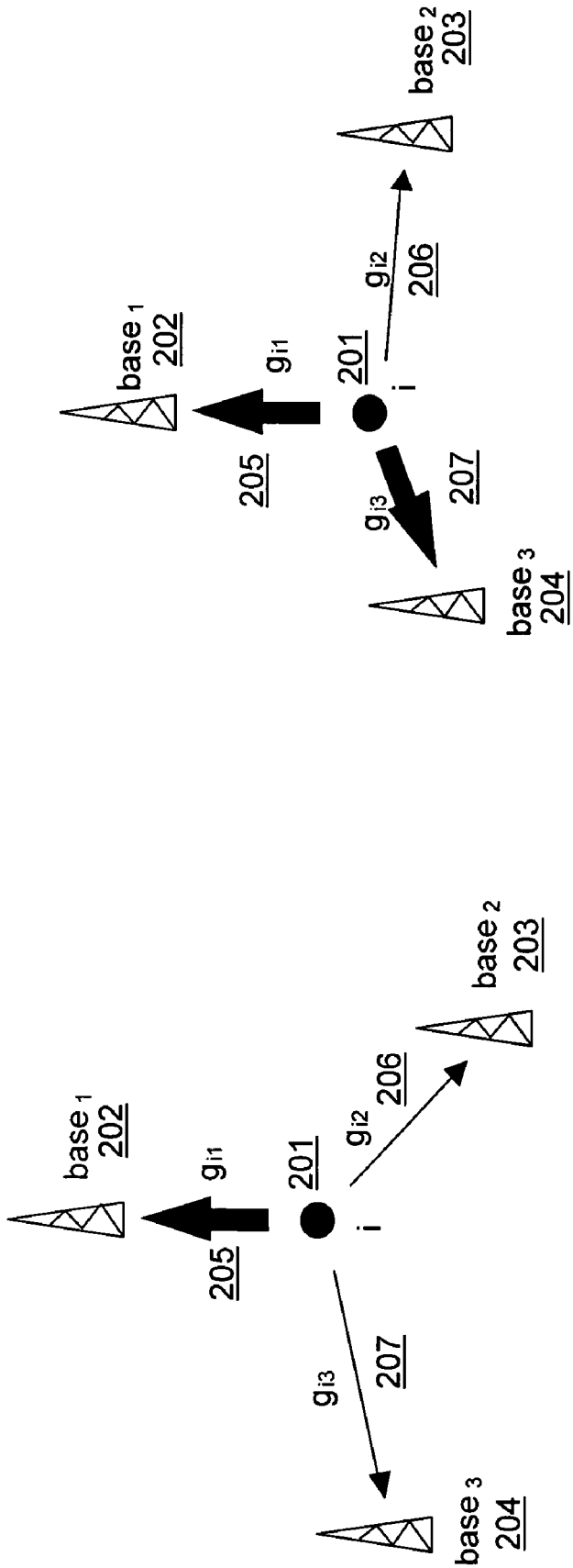

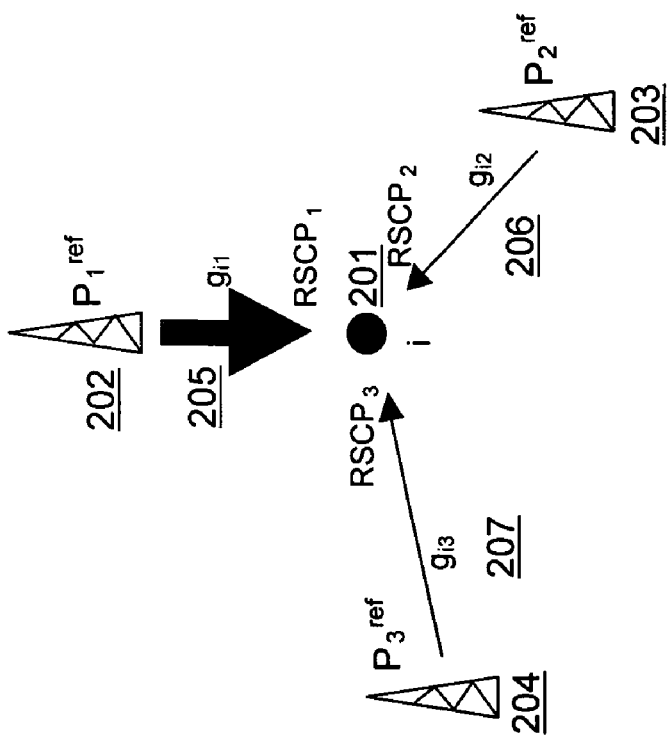
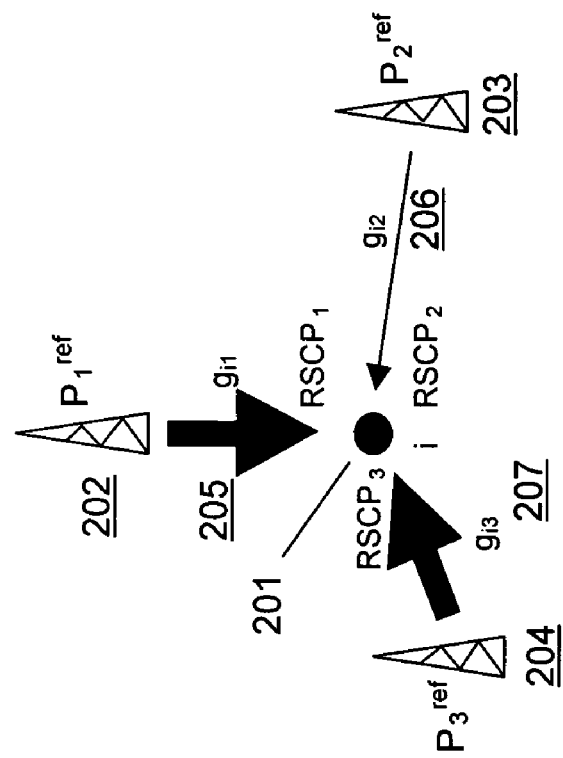
*Figure 3b*
*Figure 3a*

UPLINK RESOURCE ALLOCATION TO CONTROL INTERCELL INTERFERENCE IN A WIRELESS COMMUNICATION SYSTEM

TECHNICAL FIELD

This invention relates to an interference control apparatus and method for uplink access in a wireless communication system. The invention is applicable to, but not limited to, a communication resource access, particularly for an enhanced uplink of packet-based data employed in a Universal Terrestrial Radio Access (UTRA) Wideband-CDMA system, as used in the Universal Mobile Telecommunication Standard (UMTS).

BACKGROUND OF THE INVENTION

Wireless communication systems, for example cellular telephony or private mobile radio communication systems, typically provide for radio telecommunication links to be arranged between a plurality of base transceiver stations (BTSs) and a plurality of subscriber units, often termed mobile stations (MSs).

Wireless communication systems are distinguished over fixed communication systems, such as the public switched telephone network (PSTN), principally in that mobile stations move among BTS coverage areas, and in doing so encounter varying radio propagation environments.

In a wireless communication system, each BTS has associated with it a particular geographical coverage area (or cell). The coverage area is defined by a particular range where the BTS can maintain acceptable communications with MSs operating within its serving cell. Coverage areas for a plurality of BTSs can be aggregated for an extensive coverage area. An embodiment of the present invention is described with reference to the Third Generation Partnership Project (3 GPP) defining portions of the Universal Mobile Telecommunication Standard (UMTS), including the time division duplex (TD-CDMA) mode of operation. 3GPP standards and technical release relating to the present invention include 3GPP TR 25.211, TR 25.212, TR 25.213, TR 25.214, TR 25.215, TR 25.808, TR 25.221, TR 25.222, TR 25.223, TR 25.224, TR 25.225, TS 25.309, TR 25.804, TS 21.101, and TR 21.905 hereby incorporated within this application, in their entireties by reference. 3GPP documents can be obtained from 3GPP Support Office, 650 Route des Lucioles, Sophia Antipolis, Valbonne, FRANCE, or on the Internet at www.3gpp.org.

In UMTS terminology, a BTS is referred to as a Node B, and subscriber equipment (or mobile stations) are referred to as user equipment (UEs). With the rapid development of services provided to users in the wireless communication arena, UEs can encompass many forms of communication devices, from cellular phones or radios, through personal data accessories (PDAs) and MP-3 players to wireless video units and wireless internet units.

In UMTS terminology, the communication link from the Node B to a UE is referred to as the downlink channel. Conversely, the communication link from a UE to the Node B is referred to as the uplink channel.

In such wireless communication systems, methods for simultaneously using available communication resources exist where such communication resources are shared by a number of users (mobile stations). These methods are sometimes termed multiple access techniques. Typically, some communication resources (say communications channels, time-slots, code sequences, etc) are used for carrying traffic while other channels are used for transferring control information, such as call paging, between the Node Bs and the UEs.

It is worth noting that transport channels exist between the physical layer and the medium access control (MAC) in the system hierarchy. Transport channels can define how data is transferred over the radio interface. Logical channels exist between MAC and the radio link control (RLC)/radio resource control (RRC)layers. Logical channels define what is transported. Physical channels define what is actually sent over the radio interface, i.e. between layer 1 entities in a UE and a Node B.

A number of multiple access techniques exist, whereby a finite communication resource is divided according to attributes such as: (i) frequency division multiple access (FDMA) in which one of a plurality of channels at different frequencies is assigned to a particular mobile station for use during the duration of a call; (ii) time division multiple access (TDMA) whereby each communication resource, say a frequency channel used in the communication system, is shared among users by dividing the resource into a number of distinct time periods (time-slots, frames, etc.); and (iii) code division multiple access (CDMA) whereby communication is performed by using all of the respective frequencies, at all of the time periods, and the resource is shared by allocating each communication a particular code, to differentiate desired signals from undesired signals.

Within such multiple access techniques, different duplex (two-way communication) paths are arranged. Such paths can be arranged in a frequency division duplex (FDD) configuration, whereby a frequency is dedicated for uplink communication and a second frequency is dedicated for downlink communication. Alternatively, the paths can be arranged in a time division duplex (TDD) configuration, whereby a first time period is dedicated for uplink communication and a second time period is dedicated for downlink communication on an alternating basis.

Present day communication systems, both wireless and wire-line, have a requirement to transfer data between communications units. Data, in this context, includes signaling information and traffic such as data, video, and audio communication. Such data transfer needs to be effectively and efficiently provided for, in order to optimize the use of limited communication resources.

Recent focus in 3GPP has been on the introduction and development of an "enhanced uplink" feature to provide fast scheduling and allocation of system resources for uplink packet-based data, and to serve as a compliment to HSDPA (high-speed downlink packet access). Within HSDPA (downlink), a scheduling (or downlink resource allocation) entity is placed in the Node-B network entity (previously scheduling was performed by a Radio network controller, RNC). The scheduler resides within a new MAC entity termed the MAC-hs.

For HSDPA, scheduling is generally distributed among Node-Bs and downlink soft handover (macro-diversity) is not supported. That is to say that a scheduler exists in each cell which is largely, or wholly unaware of scheduling decisions made in other cells. Each scheduler operates independently. Feedback is provided to the scheduler from the UE in the form of Channel Quality Information (CQI). This information enables the scheduler to accommodate each users particular C/(N+I) (i.e. carrier to noise plus interference power ratio) situation. If schedulers in other cells are generating interference to a UE, this is reflected in the CQI report to the UE's serving cell scheduler, and link parameters may be adjusted in response by the scheduler to maintain an acceptable quality or reliability of radio communication between the base station and the UE. Examples of parameters which may be adjusted in accordance to the UE CQI feedback include: (i) the data rate; (ii) the transmit power; (iii) the modulation format (QPSK/16-QAM); and (iv) the degree of FEC coding applied An enhanced uplink feature was first implemented for the FDD 3GPP variant. In this case, a scheduler is placed in the Node-B (inside a so-called MAC-e function). As a result of the scheduling function being located in the Node-B, scheduling is largely decentralized. However, because uplink signals from a UE may significantly interfere with the operation of other cells, some degree of co-ordination is required between schedulers of different cells.

Soft handover is also supported for uplink in FDD, and this too requires some control or feedback to the UE from all base stations actively receiving its transmissions. This can similarly be thought of as a form of scheduler coordination between cells.

In reference to FIG. 1a, coordination between cell schedulers has been provided for the FDD enhanced uplink by means of non-serving cells (i.e. cells 003 and 004 in the "active set" but which are not the primary controlling cell 002) providing feedback to the UE 001. The "active set" is defined as the set of cells actively receiving the uplink transmission from the UE 101. Due to the fact that in FDD WCDMA, uplink signals from each user interfere with those of other users, the transmission from UE 101 causes some degree of interference in cells 003 and 004. There is no explicit direct, co-ordination between Node-B's of the active set (002, 003, and 004)—the coordination is effected via the control feedback to the UE.

Control of the UE transmission power and data rate takes the form of grant commands sent from multiple cells to the same UE. The UE receives an "absolute" grant from the serving cell, and may also receive "relative" grants from neighboring cells in the active set. The absolute grant channel (E-AGCH) 007 is used by the serving cell scheduler to convey information to the UE about which resources it may use. Uplink resources are generally thought of in FDD WCDMA as "Rise-over-Thermal" (RoT) resources wherein an allowable received-interference level threshold is set for the base station (relative to thermal noise in the receiver) and each user is effectively granted a fraction of this allowable received interference power. As the allowable RoT set-point is increased, so the interference level at the base station increases and the harder it becomes for a UEs signal to be detected. Thus, the consequence of increasing the RoT is that the coverage area of the cell is reduced. The RoT set-point must therefore be configured correctly for a given deployment to ensure the desired system coverage is met.

If a user is located close to a cell boundary, his uplink transmissions may contribute significantly to the received interference levels observed in a neighbor cell and may cause an allowable interference target in that cell to be exceeded. This can reduce the coverage and degrade the radio communication in that neighbor cell. This is an undesirable scenario, since decisions made by one scheduler in one cell may have a detrimental (and sometimes catastrophic) impact on the coverage or throughput in another cell. Some form of preemptive or reactive action is therefore required to accommodate for this scenario.

For the FDD WCDMA enhanced uplink, reactive (rather than preemptive) action is taken. The reactive action takes the form of the E-RGCH feedback commands 005, 006 from the neighbor cells 004 and 003, respectively, which can be used by a particular scheduler to reduce the UE transmit power when the uplink signal is causing excessive interference in that schedulers' cell.

Thus, uplink interference coordination can be achieved between schedulers but without explicit need for direct inter-Node-B communication. This is beneficial since a distributed scheduling architecture may be retained on the network side (where schedulers do not need to communicate with each other), and this enables the schedulers to be located in the Node-B which can facilitate faster scheduling, lower latency and faster response to retransmissions. When Hybrid ARQ is used (H-ARQ) this is also advantageous since retransmissions can be combined in a soft buffer in the Node-B, obviating the need to relay soft information over the Node-B/RNC interface (Iub).

Uplink soft handover between cell sites is typically not supported for TDD. Nor is the UE currently required to decode information sent on a downlink from any cell other than the serving cell. Thus, the FDD solution to control inter-cell interference levels throughout the system using E-AGCH from serving cells and E-RGCH from neighboring cells is not appropriate for TDD enhanced uplink. A requirement for the UE's to listen to commands from multiple cells could be introduced, enabling the same E-RGCH feedback scheme to be used. However, this would significantly increase the UE receiver complexity and for this reason, this is not an attractive solution. In reference to FIG. 1b, UE 011 is in TDD communication 017 with its serving Node-B 012, however the UE 011 uplink also causes interference to neighboring cells served by Node-B's 013 and 014.

Other mechanisms for controlling uplink intercell interference must therefore be sought. It is again advantageous to find solutions to this problem that can operate within a distributed scheduling architecture in which a scheduler exists for each cell, or for each Node-B, that may operate independently of schedulers for other cells. This is so that the benefits of a distributed architecture can be retained. These advantages include: (i) faster scheduling; (ii) lower transmission latency; (iii) faster response to retransmissions: (iv) absence of a need for inter-cell or inter-site communication interfaces; (v) reduction in network complexity; and (vi) favorable architecture for hybrid automatic repeat requests, H-ARQ.

SUMMARY OF THE INVENTION

Embodiments of the present invention exploit the reciprocity of radio channels in TDD and FDD wireless communication systems to enable distributed schedulers in an enhanced uplink system to preemptively control intercell interference levels. Each cell's base station transmits a downlink reference (or so-called "beacon" signal) The transmission power of the beacon signal (at the transmitter) is known to the UE, because it is encoded on the beacon signal (and/or may be a default value). A UE monitors the received signal strength (received signal code power, "RSCP) of the downlink beacon signals from one or more base stations (received at the UE). The transmitted and received beacon signal power levels for the respective base stations (Node-Bs) are used by the UE to control the amount of inter-cell interference that the UE generates by its uplink transmissions. In further embodiments, the transmitted and received beacon signal power levels, or values derived therefrom, are transmitted by the UE to its serving Node-B (base station), where a transmission parameter scheduling mechanism is used to grant an uplink transmission parameter grant to the UE, thereby controlling the intercell interference generated by the UE's uplink transmissions. There is no need for the UE to receive data content from controlling signals from other (non-serving) cells, and as such embodiments of the present invention advantageously suit the characteristics of the current 3GPP TDD architecture and avoid major increases in UE receiver complexity.

BRIEF DESCRIPTION OF THE DRAWINGS

FIG. 2a illustrates uplink conditions for a mobile station in favorable radio propagation conditions for minimum intercell interference (a "high geometry" situation).

FIG. 2b illustrates uplink conditions for a mobile station in difficult radio propagation conditions (a "low geometry" situation).

FIG. 3a illustrates downlink conditions for a mobile station in favorable radio propagation conditions (a "high geometry" situation).

FIG. 3b illustrates downlink conditions for a mobile station in difficult radio propagation conditions (a "low geometry" situation).

DETAILED DESCRIPTION OF THE INVENTION

Figure 1A:
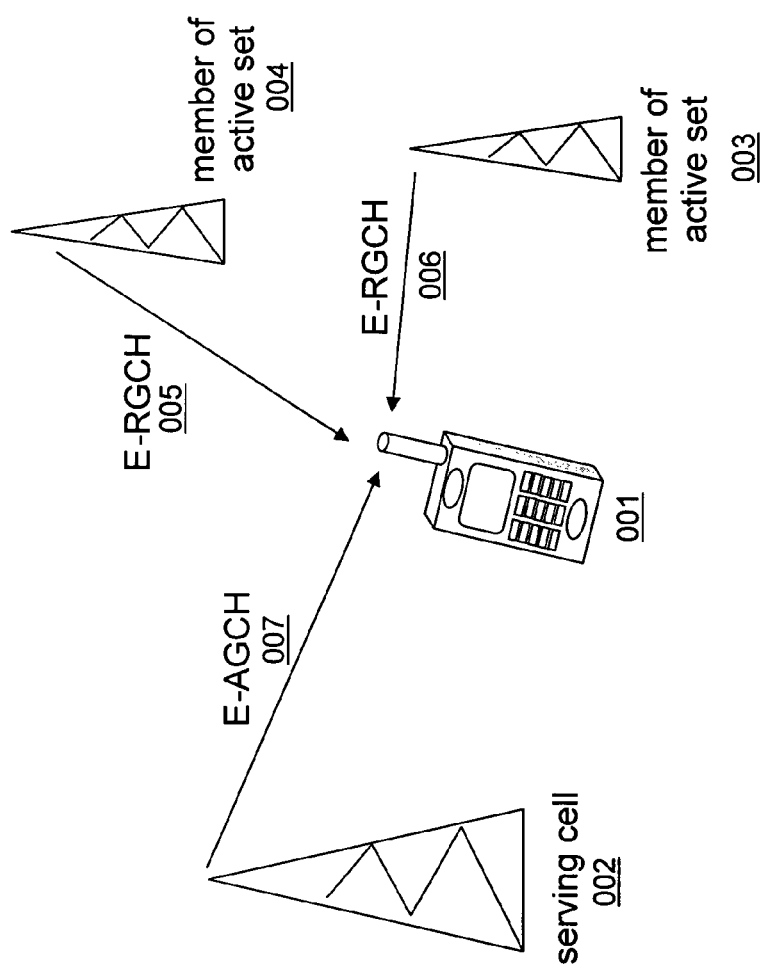
FIG. 1a illustrates a mobile station in communication with a serving cell and members of an active set in a FDD wireless communication system.
Figure 1B:
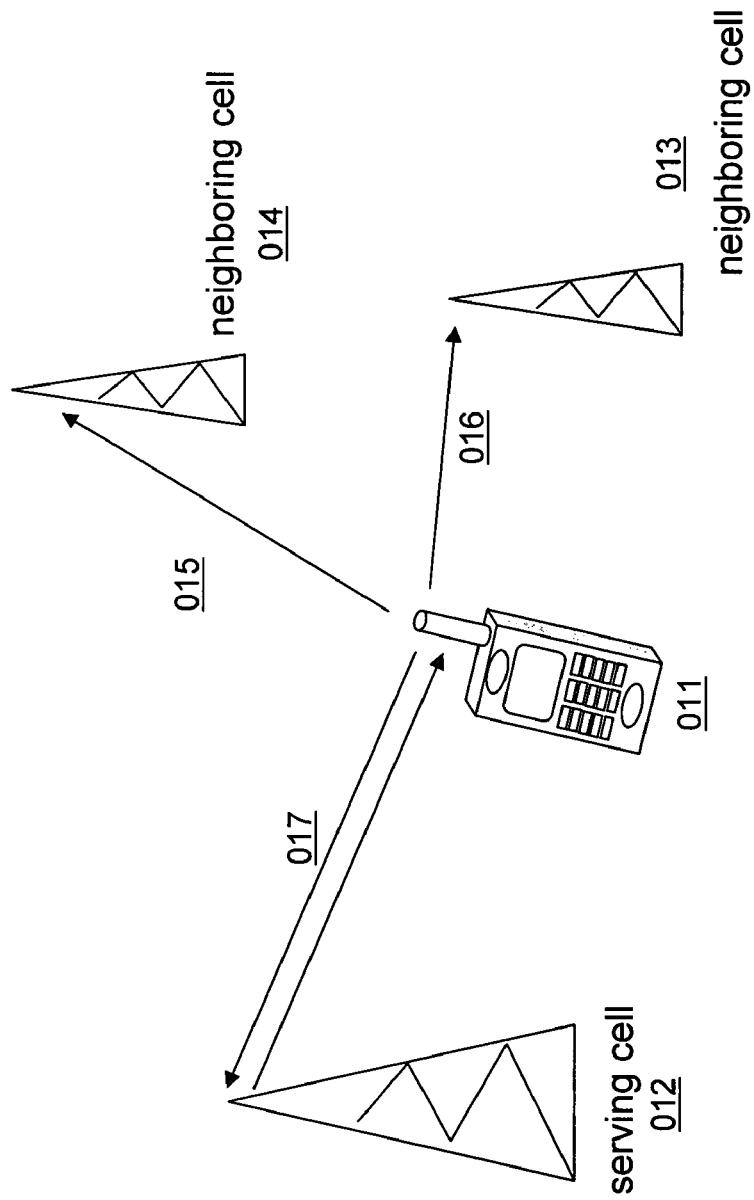
FIG. 1b illustrates a mobile station in communicating with a serving cell, and interfering with neighboring cells in a TDD wireless communication system. Note: although soft handover is not supported within the TDD standard (supporting signaling is not included), it is conceivable that in other or similar systems one may implement a Node-B and system which does "listen" for out-of-cell UE signals, to decode these and forward them up to an RNC or other central point or network entity for combining.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this section prevails over the definition that is incorporated herein by reference.

As used herein, "a" or "an" means "at least one" or "one or more."

In reference to FIGS. 2a and 2b, a UE 201 is in communication with its serving Node-B (base station) 202. The uplink signal also arrives at neighboring cell Node-Bs 203 and 204. There exists a signal path gain between each UE (denoted "i") and each Node-B base station receiver ("j") in the system. The path gain between UE "i" and Node-B base station receiver "j" is denoted $g_{ij}$ 207, 205, and 206 for Node-Bs 204, 202, and 203, respectively. A UE close to his serving Node-B will typically have high path gain (illustrated as bold arrows) to that cell, and is likely to have low path gain (illustrated as thin arrows) to other cells. For example path gain 205 in FIG. 2a, is large and so is denoted by a bold arrow.

For a given transmission from the $i^{th}$ UE, the ratio of power received at his serving cell (J) to the sum of the power received at all other cells is given the term "geometry" ($\Phi$):

$$\Phi_i = \frac{g_{iJ}}{\sum_{j \neq J} g_{ij}} \quad [1]$$

Users with high geometry generally interfere less with neighbor cells than UEs with low geometry. It would thus be beneficial if the scheduler had knowledge of the geometry of each UE, since the amount of intercell interference they cause could be predicted before the scheduling grants are sent to the users with the result that the intercell interference is managed and controlled.

Users with high and low geometry are illustrated in FIGS. 2a and 2b, for high geometry and low geometry cases, respectively, where the thickness of the transmission path arrows represents the path gain (a wider arrow representing higher path gain).

The geometry of the user can be calculated by the network given the received uplink signal powers at each of the base stations. However, this requires that the received signal power measurements for a given UE are collected at that UE's serving Node-B, requiring the establishment of new communication links between the serving Node-B and the Node-B's in neighboring cells (recall this is something we are trying to avoid).

Alternatively, the received power measurements for a given UE could be collected at some other central point (such as a Radio Network Controller, RNC) and then relayed back out to the UE's serving Node-B. Unfortunately, this involves transmission delays of the measurement information within the network, and could mean that the information is "old" before it can be used by the scheduler. It also adds signaling overhead within the network.

An embodiment of the present invention exploits the channel reciprocity for TDD to avoid the issues discussed above. For TDD, because the downlink and uplink channels are reciprocal, geometry (or the corresponding path gains $g_{ij}$) can be measured by the UE using downlink reference, or beacon, signals and can be signaled to the serving Node-B for use by a scheduling process. Such downlink beacon signals already exist for 3GPP TDD WCDMA systems. They are transmitted at a fixed reference power (configured for each cell) once or twice within each radio frame. They are located in the same timeslot as primary synchronization signals, which enable the UE to find the location of the beacon timeslot. Thus, it is possible for the UE to locate in time, the beacon transmissions from various cells (including the serving cell) and to measure the received signal code power levels (RSCP) of those beacon transmissions including the serving cell.

The transmit reference power of the beacon signal is signaled within the beacon transmission itself in each cell. Thus in reference to FIGS. 3a and 3b, the UE 201 can listen to the beacon transmissions from base stations (e.g. beacon transmissions 205, 206, and 207 from Node-Bs 202, 203, and 204, respectively). Each beacon transmission contains a reference sequence or pilot signal and measurement by the UE of the strength of this part of the signal is sufficient to provide the desired RSCP measurement. The information content carried by neighbor cell beacon signals need not necessarily be decoded by the UE. The reference transmit power levels ($P_j^{ref}$) pertinent to each beacon signal are signaled to the UE either within the information content of the serving cell beacon signal, or alternatively, the UE may decode the neighboring cell beacon signal information, itself. In either case, for each cell (j), the UE (i) is then able to calculate the path gain:

$$g_{i,j} = \frac{RSCP_j}{P_j^{ref}} \quad [2]$$

By doing this for each cell, it is clear that the UE can calculate his own geometry $\Phi_i$ in an embodiment via equation [1] and can report this to the network for use by an uplink scheduling process.

In other embodiments, similar or related metrics (figures of merit) can be derived, such as the ratio of the serving cell (J) path gain to the strongest neighbor cell (K) path gain:

$$\Phi_i' = \frac{g_{iJ}}{g_{iK}} \quad [3]$$

In other embodiments, when the reference transmit power levels ($P_j^{ref}$) are equal, and the beacon signals from the multiple cells are transmitted over a common period of time, the UE can make an approximate estimate to $\Phi_i$ of equation [1] by taking the ratio of the RSCP measured for the serving cell, to the residual non-serving cell power, "ISCP". ISCP is the total intercell interference plus thermal noise (i.e. sum of non-serving cell received power) measured by the UE. As mentioned, this approximation assumes that $P_j^{ref}$ is the same for all cells in the network and that only beacon signals are transmitted on the beacon timeslot(s) such that ISCP is approximately equal to the sum of $RSCP_j$ for all $j \neq J$.

$$\Phi_i'' = \frac{RSCP_J}{ISCP} \quad [4]$$

ISCP may be estimated in several known ways, two examples are herein described. In the first example, a noise-free portion of the serving cell beacon signal is reconstructed and is subtracted from the composite received signal. The power of the remaining signal is then measured to provide the required ISCP estimate. In the second example, the total power "T" of the composite signal (containing the beacon signals from the multiple cells) is measured, and the power of the serving cell signal ($RSCP_J$) is separately measured. ISCP is then estimated as $T-RSCP_J$ such that:

$$\Phi_i''' = \frac{RSCP_J}{(T - RSCP_J)} \quad [5]$$

where ISCP is the total intercell interference plus thermal noise (i.e. sum of non-serving cell received power) measured by the UE. Note that this approximation assumes that $P_j^{ref}$ is the same for all cells in the network and that only beacon signals are transmitted on the beacon timeslot(s) such that ISCP is approximately equal to the sum of $RSCP_j$ for all $j \neq J$.

In a further embodiment, a UE can report the individual $RSCP_j$ values that it received to the serving Node-B, and the serving Node-B calculates the geometry or other metric itself, to provide to the scheduling process. Calculating the geometry, or other metric, at the serving Node-B can offload computation from the UE, however at the cost of transmitting more data from the UE to the serving Node-B.

In these cases, the geometry (or approximated version thereof) information is conveyed to the base station scheduler in the serving Node-B associated with each particular UE. The scheduler can then preemptively avoid excessive intercell interference by scheduling the UE such that its transmissions do not arrive in the neighbor cells with excessive power. In this respect the geometry value of equation [3] is particularly useful, since the maximum received signal level at any neighbor cell (i.e. the strongest one) may be directly calculated if the transmit power of the UE (or receive power in the serving cell) is known. The received power level in all other cells can then be known to be less than this value, and could be considered to somewhat negligible.

Scheduling of uplink resources to UEs according to their geometry necessarily means that the transmission rate per timeslot is reduced for UEs with low geometry and is increased for users with high geometry. Advantageously, this can be shown to have further benefits in terms of system capacity. Scheduled resources for uplink are generally thought of as received C/(N+I) resources, or rise over thermal (RoT) resources. When users are scheduled an amount of uplink resources in proportion to their geometry, the overall intercell interference generated for a given total amount of resources scheduled in each cell is reduced when compared to the situation in which each user is scheduled an equal fraction of the assigned uplink resources.

In further embodiments, for either TDD or FDD systems, a UE can autonomously use a beacon signal RSCP measurement to control its own uplink transmission characteristics, rather than waiting for commands back from the serving Node-B scheduler. This can effect a very fast secondary interference control which could advantageously be based upon more recent path loss measurement information at the UE than that used by the basestation scheduler when granting the transmission resources. The updated measurements could then be signaled to the basestation scheduler as described in previous embodiments. The basestation scheduler may then use these updated measurements on which to base further scheduling decisions. Embodiments of the present invention can also be used for FDD wireless communication systems. Although uplink and downlink transmission frequencies are different for FDD systems, rather than common as in TDD systems, a downlink transmission path gain can provide a less precise, but usable longer-term estimate of an uplink transmission path gain between a particular Node-B and UE.

Figure 4B:
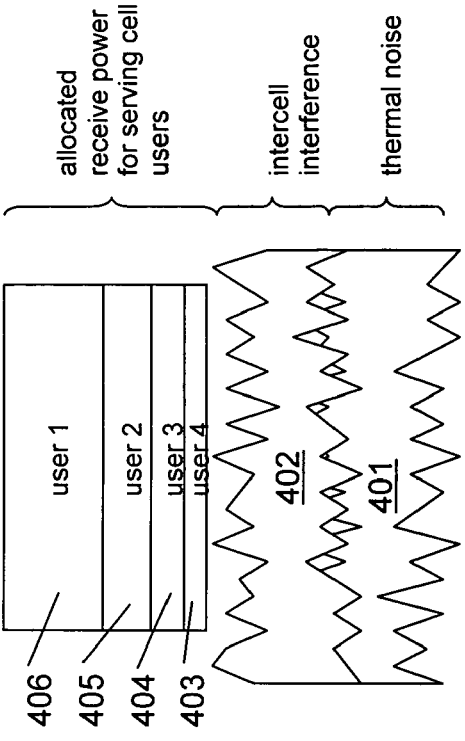
FIG. 4b illustrates an embodiment of the invention with geometric power scheduling.
Figure 4A:
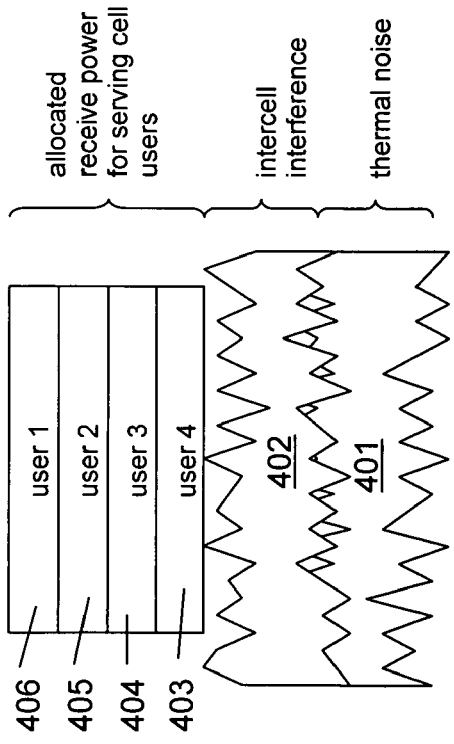
FIG. 4a illustrates a prior art method for fair power scheduling.

The difference between fair and geometrically-proportional scheduling is shown pictorially in FIGS. 4a and 4b. In prior art FIG. 4a, each user is assigned an equal fraction (406, 405, 404, and 403) of the total allocated receive power for serving cell users. In the embodiment of the invention as shown in FIG. 4b, the receive power resources are shared among users according to their geometry (user 1 406 has the highest geometry and user 4 403 has the lowest geometry). In FIGS. 4a and 4b 401 and 402 represent background levels of thermal noise and intercell interference, respectively.

When implementing geometrically-proportional scheduling, the scheduler can ensure that each user creates the same (or a similar) level of intercell interference as each other user, regardless of the users geometry. This is in contrast to fair scheduling in which the degree of intercell interference caused by each user is inversely proportional to the user's geometry. As such, in the case of fair scheduling, the system is often limited by only a few low-geometry users, and this penalizes the high geometry users. By sharing out the intercell "cost" of each user more fairly amongst users (as in the geometrically-proportional case), the system is less compromised by these worst-case users, and system capacity can be increased.

In an embodiment of the present invention, a 3GPP TDD enhanced uplink system is considered in which each UE measures the downlink beacon RSCP from multiple neighboring cells (possibly using the primary synchronization channels to locate the beacon transmissions). The UEs also decode the system information contained on one or more of the beacon signals, and retrieve the beacon reference transmit power for each cell ($P_j^{ref}$). Using this information, the UEs calculate the path gain to the serving cell and to each neighbor cell (via equation [2]). They then calculate the geometry via equation [1], or a similar metric based upon estimated path gains, and signal this information to the MAC-e entity responsible for uplink scheduling at the serving cell Node-B. The geometry information is pertinent to the uplink even though it is measured on downlink, due to the reciprocity of the TDD radio channel (the same frequency is used for uplink and downlink transmissions). This geometry information can also be applied to FDD systems, except that the uplink and downlink channels can be less correlated and therefore averaged or filtered downlink received signal power measurement or path gain would need to be used, adding latency to the interference control response time.

Figure 5:
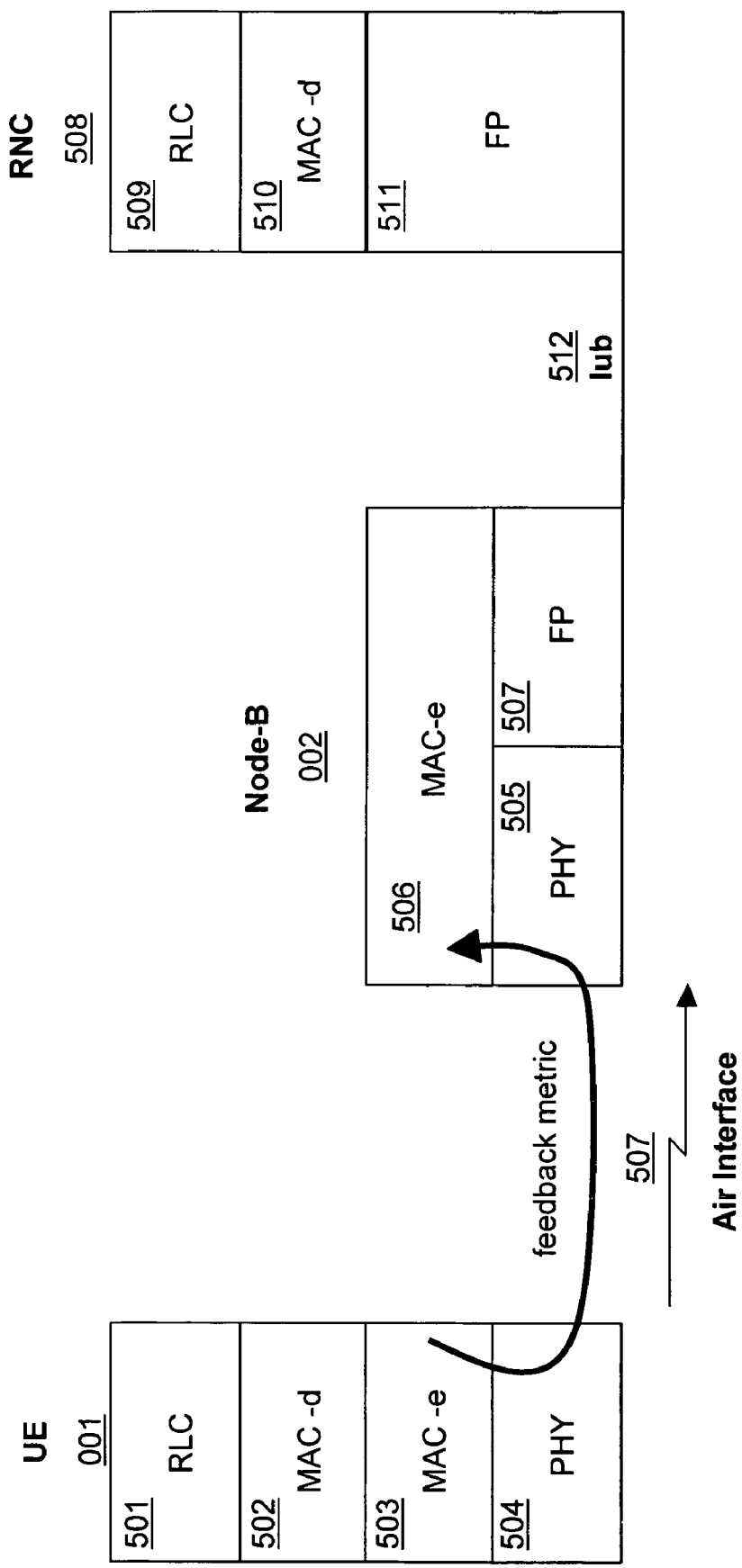
FIG. 5 illustrates communication between MAC-e layers of a UE and a Node-b according to an embodiment of the invention.

Without loss of generality the feedback information may be contained or otherwise multiplexed within an actual enhanced uplink transmission, or may be carried on an associated control channel. The feedback signaling is communicated between the MAC-e entity in the UE and the MAC-e entity in the serving cell Node-B as shown in FIG. 5.

The network (UTRAN) is comprised of Radio Network Controllers (RNCs) each subtending multiple cell sites (Node-B's). Each Node-B contains a MAC-e entity responsible for scheduling of one or more cells or sectors supported by the Node-B. The schedulers do not require coordination between sites, and hence the need for Node-B to Node-B interfaces is obviated. Of course, schedulers dealing with different cells subtended by the same Node-B may communicate internally to the Node-B if the implementation dictates.

The scheduler is responsible for sharing out uplink interference resources amongst users. The interference resources consist of an intracell interference component and an intercell interference component and are specified as allowable interference levels relative to the thermal noise (so-called "Rise over Thermal", RoT).

A TDD WCDMA receiver can incorporate a joint detection receiver which can cancel some of the energy from other serving cell users. However, the cancellation process is not perfect and some residual interference may remain. The residual interference from each user is likely to vary to some degree in proportion with the received power from that user. Thus, a user granted more received power at the base station will have a higher intracell "cost" than a user granted a lower received-power quotient.

The scheduler can calculate/estimate an intracell cost factor ($F_{intra}$) for each UE (i), which when multiplied by the hypothetical received power grant results in an absolute intracell cost associated with that grant. The cost factor could for example simply be a fixed scalar related to the efficiency of the joint detection process (0 . . . 1). For example:

$$F_{int\,ra,i} = 1 - JD\,\text{efficiency} \qquad [6]$$

$$COST_{int\,ra,i} = F_{int\,ra,i} \times \text{grant}_i \qquad [7]$$

Each user's transmission to the serving cell will also appear at a neighboring cell receiver at a level corresponding to the granted received power in the serving cell, and the ratio of the path gain to the serving cell and the path gain to the particular neighboring cell. Users granted more received power at the serving cell will interfere more with neighboring cells than those granted less power. Additionally, users with low geometry will interfere with neighbor cells more than those with high geometry.

As for the intracell case, the scheduler can determine an overall intercell "cost" factor associated with a hypothetical grant of received power resources to a given UE. The cost factor is based upon the geometry of the user. When the cost factor is multiplied by the grant, an absolute intercell cost is obtained. For example:

$$F_{inter,i} = \frac{1}{\Phi_i} \qquad [8]$$

$$COST_{inter,i} = F_{inter,i} \times grant_i \qquad [9]$$

Using the notion of intracell and intercell cost, the scheduler can apportion the allowable intracell and intercell costs to the various UEs in the schedule according to a fairness criterion.

For fair scheduling, each scheduled user in the cell governed by a particular scheduler should receive an equal received-power grant. The sum of the costs of the equal power grants should not exceed the total allowable intracell or intercell costs (these are set in order to maintain a particular outage or system reliability/stability).

For geometrically proportional scheduling, each scheduled user in the cell governed by a particular scheduler should receive a received-power grant in proportion to his geometry. Again, the sum of the costs of the power grants should not exceed the total allowable intracell or intercell costs.

Figure 6:
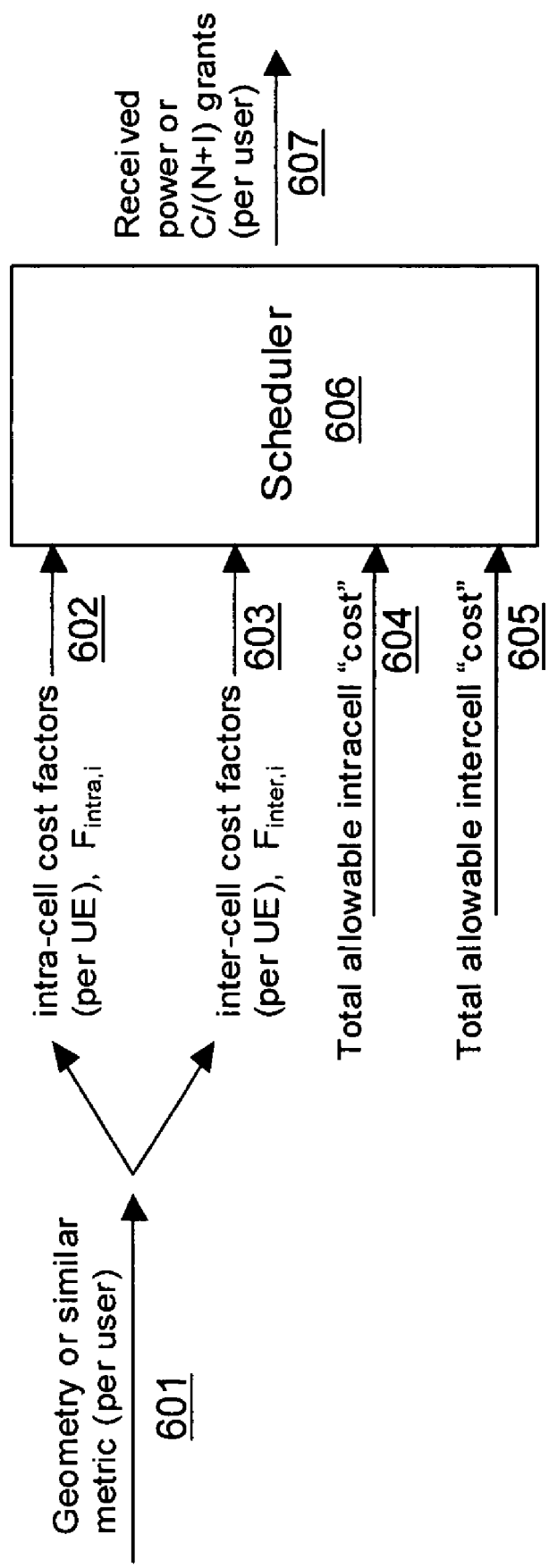
FIG. 6 illustrates the operation of a scheduler according to an embodiment of the invention.

Variable degrees of fairness can also be implemented between the fair scheduling and geometrically proportional scheduling methods, wherein power grants are scaled by a factor that is the sum of a geometry factor and a constant that represents a fairness parameter. An embodiment of the scheduling process is illustrated in FIG. 6. By consideration of the users geometry and the setting of the fairness parameter, a scheduling scheme is effected which can: (i) predict the impact of a hypothetical grant to a UE in terms of the level of intercell interference created; (ii) preemptively control and manage intercell interference in the system; (iii) maintain a desired coverage area for cells throughout the network; retain a distributed scheduling architecture for lower latency, faster retransmissions, and H-ARQ benefits; (iv) obviate the need for downlink feedback signaling overhead from other cells to control interference levels; and (v) obviate the need for a UE receiver to listen and decode messages from multiple cells, hence avoiding an increase in the UE receiver complexity.

Figure 7A:
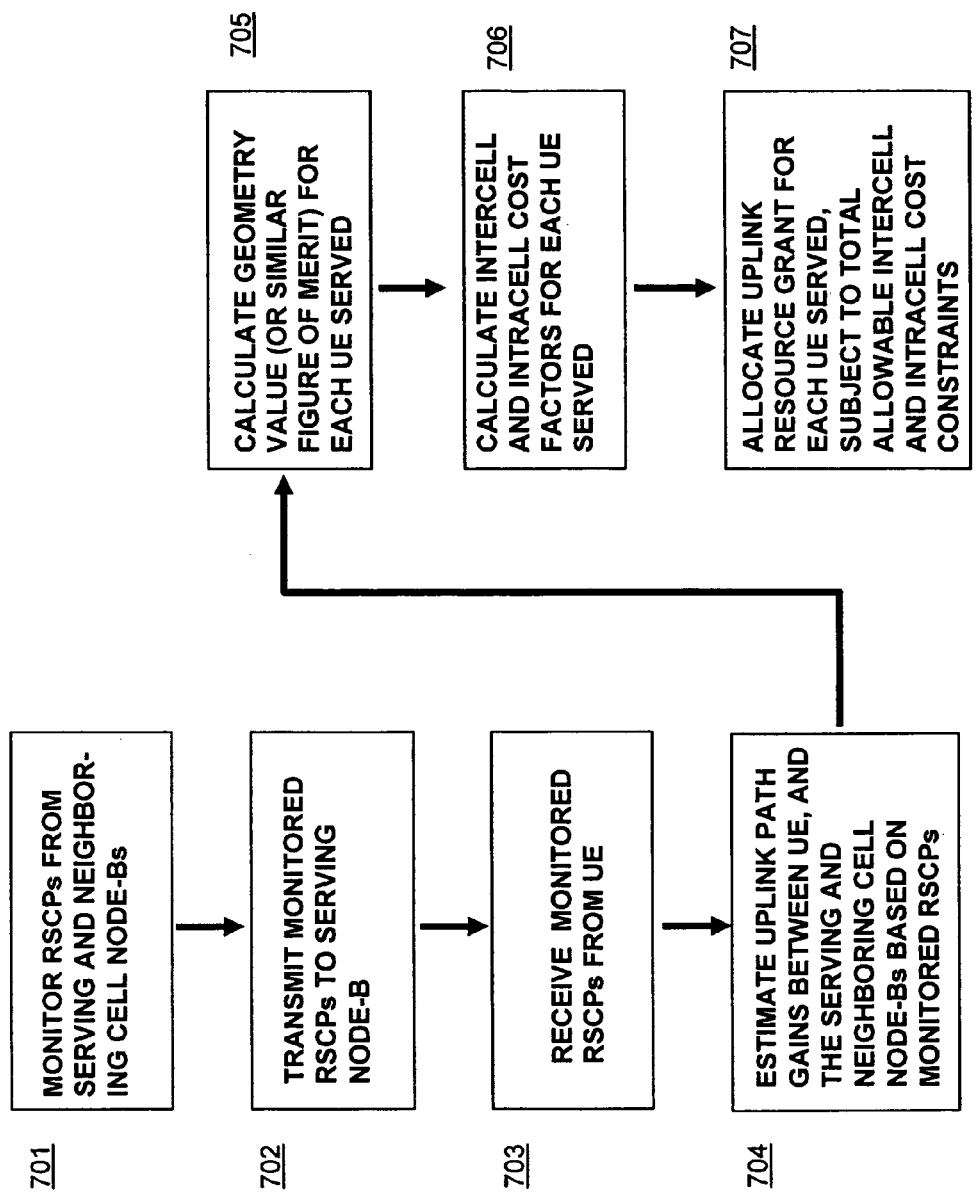
FIG. 7a illustrates a method of allocating uplink resource grants for UEs by a serving Node-B according to an embodiment of the invention.

FIG. 7a is a block diagram exemplifying a process for calculating uplink resource grants for each UE served, subject to total allowable intercell and intracell cost constraints according to an embodiment of the invention. In this particular embodiment, RSCPs are monitored from the serving cell and Node-Bs of neighboring cells by a UE in step 701. In step 702, the UE transmits the monitored RSCPs to its serving Node-b for subsequent processing. In step 703, the serving Node-b receives the monitored RSCPs from the UE and in step 704, uplink path gains between the UE and the serving and active set Node-bs are estimated on the basis of the respective downlink paths, owing to the reciprocity of the TDD channel. In step 705, the estimated uplink path gains are used to calculate a geometry value (or similar figure of merit, as discussed above) for each UE served. In step 706, intercell and intracell cost factors for each UE served by a particular Node-b are calculated by the Node-b, for example according to equations 8 and 9, above.

Figure 7B:
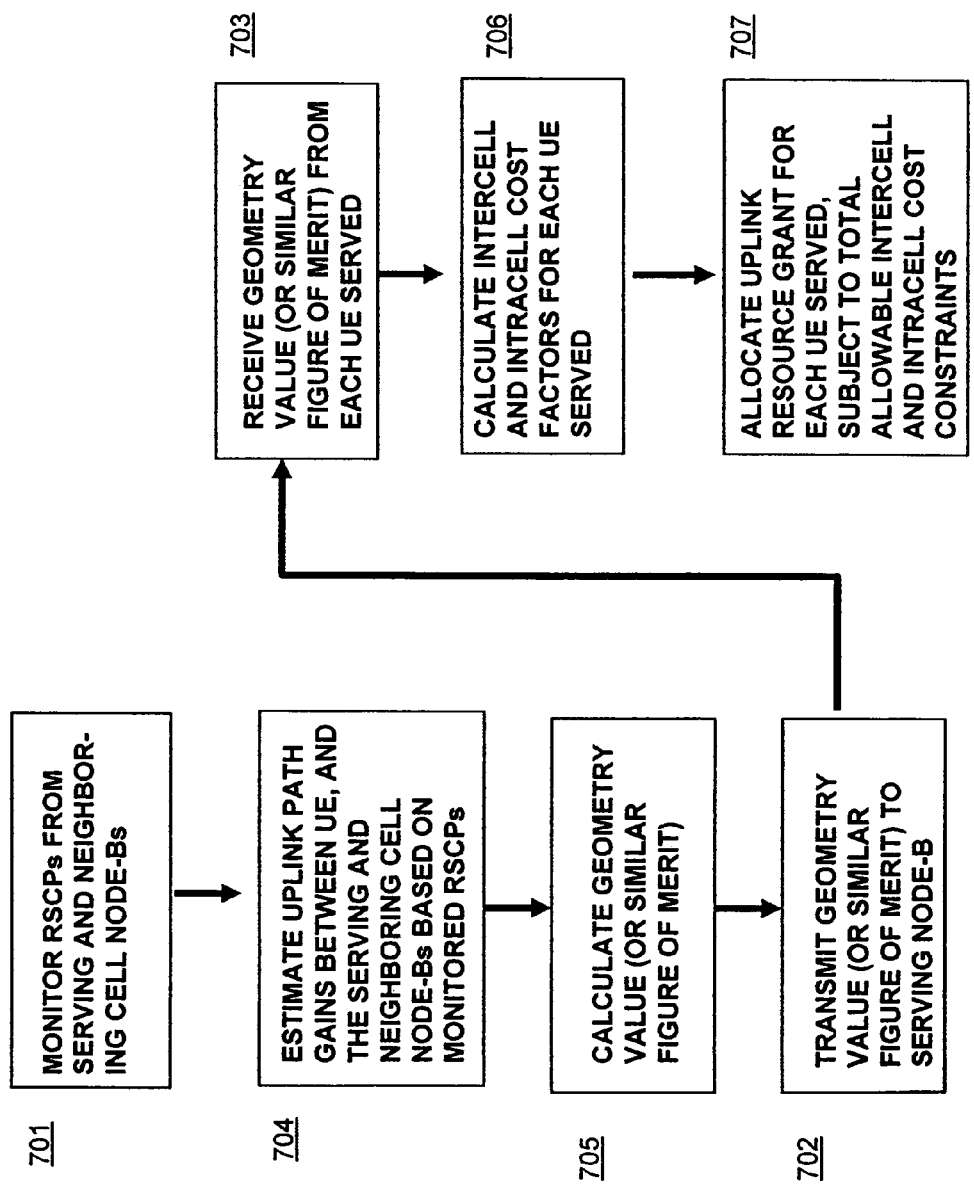
FIG. 7b illustrates a method of allocating uplink resource grants for UEs by a serving Node-B according to another embodiment of the invention.

FIG. 7b is an alternative embodiment in which uplink path gain estimate calculations (step 704) and geometry value or similar figure of merit calculations (705) are performed by the UE rather than the serving Node-B. This can reduce the necessary feedback communication bandwidth from the UE to the Node-B, but at the cost of additional computation bandwidth, memory, and power consumption at the UE. It may also mean that less overall information content is conveyed (for example, information specific to the path gain to each individual cell may be lost) and so signaling efficiency is traded-off against information content and scheduling performance.

Figure 8:
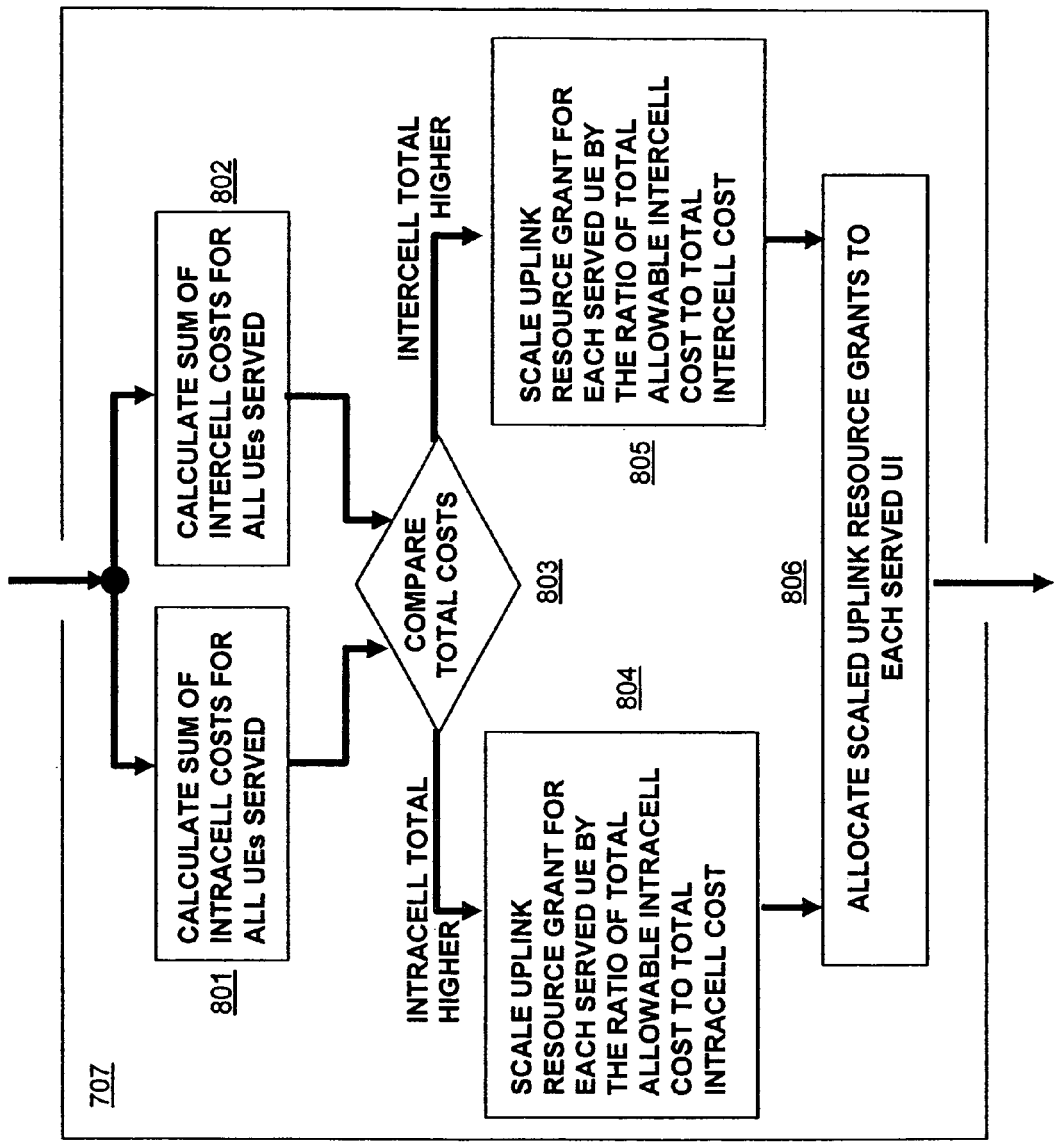
FIG. 8 illustrates an embodiment of a method to scale uplink resource grants.

FIG. 8 shows an embodiment of step 707 of FIGS. 7a and 7b in which all intracell costs and all intercell costs are separately summed (steps 801 and 801) and compared to maximum respective cost targets, in step 803. Depending on whether the intracell total cost is higher or whether the intercell cost is higher the uplink resource grants are scaled for each served UE by the ratio of total allowable intercell (or intracell, respectively) cost so that no maximum (intercell or intracell) cost target is exceeded. This process can be applied iteratively, as necessary. Although as illustrated in the embodiment of FIG. 7, steps 703 through 707 are executed at a serving Node-b (in particular by a MACe of serving Node-b), intracell and/or intercell costs could be estimated by the UE, and transmission parameters adjusted in order that the UE does not exceed predefined interference targets in serving and/or neighbor cells.

Figure 9:
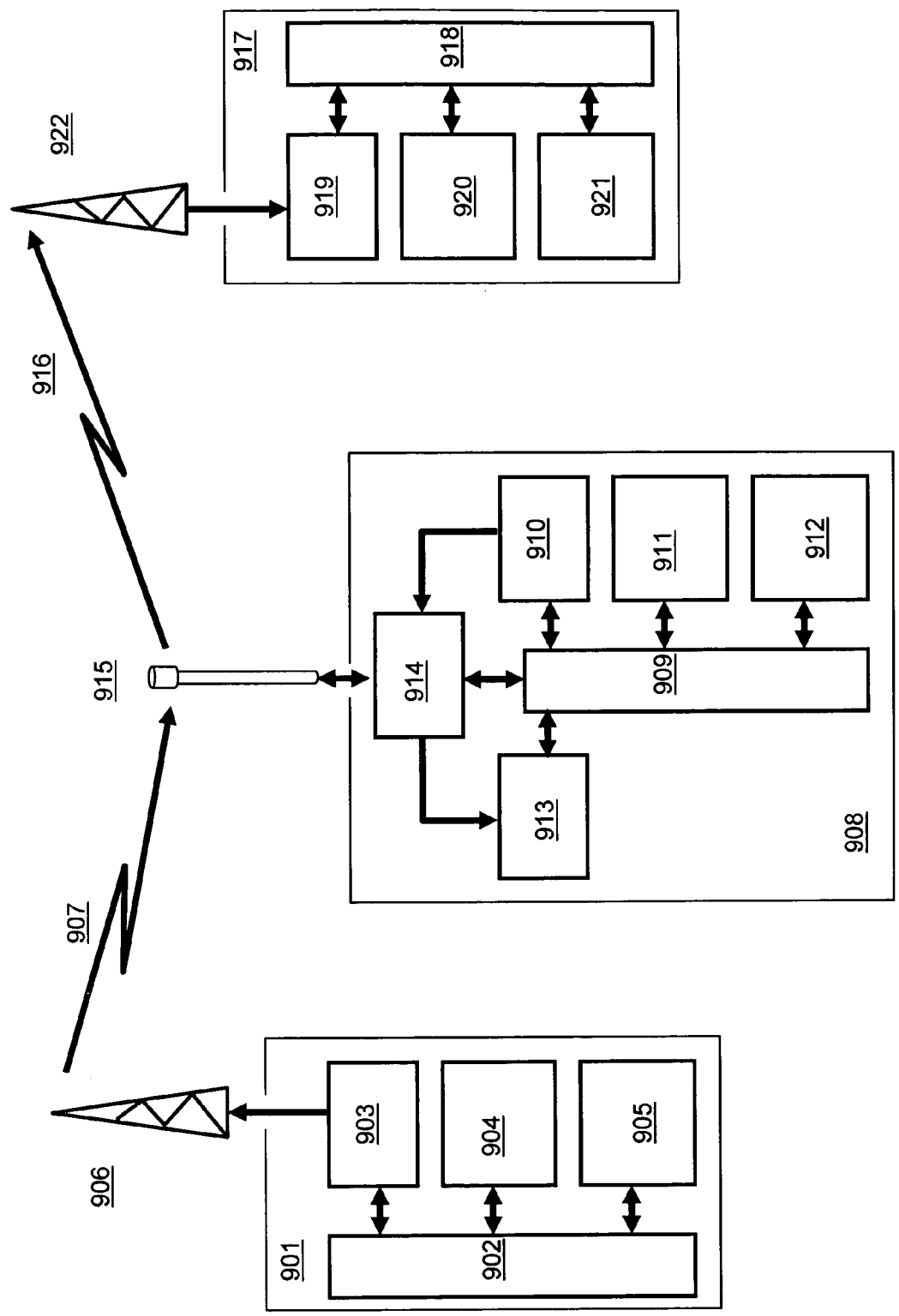
FIG. 9 illustrates a system block diagram describing an embodiment of the invention.

FIG. 9 illustrates a hardware embodiment of a further embodiment of the invention. UE 908 comprises signal connection means 909 operatively connecting receiver 913, transmitter, 910, antenna switch or duplexer 914, processor 911, and memory 912 as is well known in the art of user equipment for wireless communications. Antenna switch or duplexer 914 is connected with an UE antenna 915 for sending and receiving radio signals. 901 and 917 are Node-Bs, connected to their respective antennas 906 and 922. Node-b 901 can be essentially identical to Node-b 917, except that for purposes of this illustration, Node-b 917 is assumed to be a serving node for UE 908. Block 903 is a transmitter, block 904 is a controller, and block 905 is electronic memory. Block 902 is signal interconnection. Processor 904, under control of a set of computer instructions stored in memory 905 directs transmitter 903 to transmit RSCPs to UE 908. UE 908 monitors the reference signal (beacon signal) and measures the corresponding received power levels ("RSCP") and in one embodiment, relays them to its serving Node-B for subsequent processing. Received signal power levels can be measured through analog techniques such as an analog received signal strength indicator (RSSI) circuit, or estimated by digital signal processing techniques, as is well known in the art. In alternative embodiments UE 908 can perform additional processing on the RSCP transmissions, and the results sent to the serving Node-b. Serving Node-b 917. Block 919 in serving Node-b is a receiver, block 920 is a controller, block 921 is an electronic memory, and block 918 is a signal connection means. Controller 920 of serving Node-b contains within the electronic memory 921 to calculate uplink resource grants to each served UI according to at least one of the embodiments, discussed above. Uplink transmission parameters that can be adjusted by controller 920 to alter intracell and intercell uplink costs for a UE can include, without limitation: (i) data rate; (ii) transmission power; (iii) degree and/or nature of forward error correction; (iv) modulation format; and/or (v) code resource usage. For example, for a given uplink transmission power, data rate, degree of forward error correction, and modulation format, a first level of transmission reliability (data error rate) can be achieved. A lowering of the data rate, or an increase of the amount of forward error correction applied to the system, or the use of a more robust modulation scheme will result in a second, improved transmission reliability when transmitted at the same transmission power. Such an improvement may be exploited by a subsequent lowering of the UE transmission power to once again achieve the first transmission reliability. In such a way, adjustment of the data rate, or forward error correction coding, or modulation scheme may be used to adjust the UE transmission power, thereby controlling intercell interference while still achieving the required transmission reliability.

Variations and extensions of the embodiments described are apparent to one of ordinary skill in the art. For example, the uplink scheduler can calculate the effect or cost of a hypothetical grant of uplink resources on other cells before making the grant, using the reported measurements to derive in whole or in part the effect or cost value.

Other applications, features, and advantages of this invention will be apparent to one of ordinary skill in the art who studies this invention disclosure. Therefore the scope of this invention is to be limited only by the following claims.

The invention claimed is:

1. A tangible computer program product having executable program code stored therein for performing a method of intercell control by allocating uplink transmission resources in a mobile station of a wireless communication system, the program code operable for performing a method when executed at a mobile station, the method comprising:

receiving at least one serving base station reference signal transmission transmitted at a transmission power level;

receiving at least one non-serving base station reference signal transmission transmitted at a respective power level;

measuring at least one received signal power level corresponding to the at least one serving base station reference signal transmission;

constructing a noise-free version of one of the at least one respective reference signals;

calculating a power of the noise-free version;

estimating an at least one interference power level for the at least one non-serving base station reference signal transmission by a relationship of the noise-free version power level and the measured, received signal power of the at least one respective reference signal;

calculating a figure of merit for transmission to the at least one serving base station, wherein the figure of merit is for adjusting an uplink transmission resource parameter at the mobile station, and is based on a relationship of the at least one received signal power level and the at least one interference power level;

transmitting, to the at least one serving base station, the figure of merit to determine the uplink transmission resource parameter for the mobile station; and receiving, from the at least one serving base station, the uplink transmission resource parameter in response to the figure of merit, wherein the uplink transmission resource parameter is determined by an uplink scheduler of the at least one serving base station such that an acceptable uplink interference is predicted to be caused to the at least one non-serving base station as a result of a transmission from the mobile station to the at least one serving base station using the uplink transmission resource parameter based in part upon cell uplink path gain information.

2. The tangible computer program product of claim 1, wherein the interference power level is estimated by a relationship of serving base station path gain and strongest non-serving base station path gain.

3. A mobile station for intercell control of allocating uplink transmission resources comprising:
    means for receiving, by a mobile station, at least one serving base station reference signal transmission transmitted at a transmission power level;
    means for receiving at least one non-serving base station reference signal transmission transmitted at a respective power level;
    means for measuring at least one received signal power level corresponding to the at least one serving base station reference signal transmission;
    means for estimating an at least one interference power level for the at least one non-serving base station reference signal transmission;
    means for calculating a figure of merit for transmission to the at least one serving base station, wherein the figure of merit is for adjusting an uplink transmission resource parameter at the mobile station, and is based on a relationship of the at least one received signal power level and the at least one interference power level;
    means for transmitting, to the base station, the figure of merit to determine the uplink transmission resource parameter for the mobile station; and
    means for receiving, from the at least one serving base station, the uplink transmission resource parameter in response to the figure of merit, wherein the uplink transmission resource parameter is determined by an uplink scheduler of the at least one serving base station by generating an estimate of an interfering signal power level of a neighboring base station such that an acceptable uplink interference is predicted to be caused to the at least one non-serving base station as a result of a transmission from the mobile station to the at least one serving base station using the uplink transmission resource parameter based in part upon cell uplink path gain information.

4. The mobile station of claim 3, wherein the uplink transmission resource parameter is a member of the group of data rate, uplink transmission power, degree or nature of forward error correction, modulation format, and code resource usage.

5. The mobile station of claim 3, wherein the wireless communication system is described by a Third Generation partnership project Universal Mobile Telecommunication Standard, the base station is a Node-B, and the mobile station is a user equipment (UE).

* * * * *